United States Patent
Colgrove et al.

(10) Patent No.: US 8,001,346 B2
(45) Date of Patent: *Aug. 16, 2011

(54) COORDINATED STORAGE MANAGEMENT OPERATIONS IN REPLICATION ENVIRONMENT

(75) Inventors: John A. Colgrove, Los Altos, CA (US); Ronald S. Karr, Palo Alto, CA (US); Oleg Kiselev, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/201,921

(22) Filed: Aug. 29, 2008

(65) Prior Publication Data

US 2008/0320261 A1 Dec. 25, 2008

Related U.S. Application Data

(63) Continuation of application No. 11/589,334, filed on Oct. 30, 2006, now Pat. No. 7,421,554, which is a continuation of application No. 10/750,596, filed on Dec. 31, 2003, now Pat. No. 7,139,887.

(51) Int. Cl.
*G06F 12/00* (2006.01)

(52) U.S. Cl. .................... 711/162; 707/639

(58) Field of Classification Search ............ 711/162; 707/639

See application file for complete search history.

(56) References Cited

U.S. PATENT DOCUMENTS

| | | | |
|---|---|---|---|
| 5,155,845 A | 10/1992 | Beal et al. ............... 395/575 |
| 5,592,618 A * | 1/1997 | Micka et al. ............ 714/54 |
| 5,974,563 A | 10/1999 | Beeler, Jr. .............. 714/5 |
| 6,611,901 B1 | 8/2003 | Micka et al. ............ 711/162 |
| 6,898,681 B2 * | 5/2005 | Young ................... 711/114 |
| 6,950,915 B2 | 9/2005 | Ohno et al. ............. 711/162 |
| 7,020,743 B2 * | 3/2006 | Lee et al. ............... 711/113 |
| 7,251,713 B1 | 7/2007 | Zhang .................... 711/162 |
| 2002/0129214 A1 | 9/2002 | Sarkar ................... 711/162 |
| 2003/0051111 A1 * | 3/2003 | Nakano et al. .......... 711/162 |
| 2003/0131278 A1 | 7/2003 | Fujibayashi ............ 714/6 |
| 2003/0177321 A1 * | 9/2003 | Watanabe ............... 711/161 |
| 2005/0027748 A1 * | 2/2005 | Kisley ................... 707/200 |
| 2005/0071588 A1 * | 3/2005 | Spear et al. ............ 711/162 |

FOREIGN PATENT DOCUMENTS

EP 1 517 241 A2 6/2004

* cited by examiner

*Primary Examiner* — Hashem Farrokh
(74) *Attorney, Agent, or Firm* — Campbell Stephenson LLP

(57) ABSTRACT

A method, system, computer system, and computer-readable medium for maintaining up-to-date, consistent copies of primary data without the need to replicate modified data when the data were modified as a result of an operation that is not an application-driven write operation captured during replication. Selected storage management operations are performed on the primary and secondary data stores at points in time when the data are the same to ensure that the data stored within the data stores remain consistent. These selected storage management operations include operations that produce modified data stored in the primary data store, where a portion of the modified data are not replicated to a secondary node. Other types of storage management operations are selected to be performed on both the primary and secondary data stores, where the operations do not directly change data in the primary data store, but may affect data stored in the primary data store.

19 Claims, 9 Drawing Sheets

*System Structure*

COORDINATED STORAGE MANAGEMENT OPERATIONS IN REPLICATION ENVIRONMENT

CROSS-REFERENCE TO RELATED APPLICATIONS

The present patent application is a continuation of U.S. patent application Ser. No. 11/589,334, filed on Oct. 30, 2006, which is issued as U.S. Pat. No. 7,421,554, entitled "Coordinated Storage Management Operations in Replication Environment," which is a continuation of U.S. application Ser. No. 10/750,596, filed on Dec. 31, 2003, is issued as U.S. Pat. No. 7,139,887 and is incorporated by reference herein in its entirety and for all purposes.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. For businesses that increasingly depend on data and information for their day-to-day operations, unplanned downtime due to data loss or data corruption can hurt their reputations and bottom lines. Businesses are becoming increasingly aware of the costs imposed by data corruption and loss and are taking measures to plan for and recover from such events. Often these measures include making backup copies of primary, or production, data, which is 'live' data used for operation of the business. Backup copies of primary data are made on different physical storage devices, and often at remote locations, to ensure that a version of the primary data is consistently and continuously available.

Two areas of concern when a hardware and/or software failure occurs, as well as during the subsequent recovery, are preventing data loss and maintaining data consistency between primary and backup data storage. Consistency ensures that, even if the backup copy of the primary data is not identical to the primary data (e.g., updates to the backup copy may lag behind updates to the primary data), the backup copy represents a state of the primary data that actually existed at a previous point in time. If an application completes a sequence of write operations A, B, and C to the primary data, consistency can be maintained by preventing the write operations from occurring in reverse order with respect to one another on the backup copy of the data. The backup copy should not reflect a state that never actually occurred in the primary data, such as would have occurred if write operation C were completed before write operation B. Some write operations in the set may occur concurrently, and some or all of the write operations may be committed atomically to achieve a consistent state of the data on the secondary node.

One way to achieve consistency and avoid data loss is to ensure that every update made to the primary data is also made to the backup copy, preferably in real time. Often such "duplicate" updates are made locally on one or more "mirror" copies of the primary data by the same application program that manages the primary data. Mirrored copies of the data are typically maintained on devices attached to or immediately accessible by the primary node, and thus are subject to failure of the primary node or corruption of data accessible via the primary node.

Therefore, making mirrored copies locally does not prevent data loss, and primary data are often replicated to secondary sites. Maintaining copies of data at remote sites, however, introduces another problem. When primary data become corrupted and the result of the update corrupting the primary data is propagated to backup copies of the data through replication, "backing out" the corrupted data and restoring the primary data to a previous state is required on every copy of the data that has been made. Previously, this problem has been solved by restoring the primary data from a backup copy made before the primary data were corrupted. Backup copies are commonly made on storage devices having the same access speed as the storage devices storing the primary data. Once the primary data are restored, the entire set of primary data is copied to each backup copy to ensure consistency between the primary data and backup copies. Only then can normal operations, such as updates and replication, using primary data resume.

The previously-described technique of copying the entire set of primary data to each backup copy ensures that the data are consistent between the primary and secondary sites. However, copying the entire set of primary data to each backup copy at secondary sites uses network bandwidth unnecessarily when only a small subset of the primary data has changed. Furthermore, copying the entire set of primary data across a network requires a significant amount of time to establish a backup copy of the data, especially when large amounts of data, such as terabytes of data, are involved. All of these factors delay the resumption of normal operations and can cost companies a large amount of money due to downtime.

What is needed is the ability to maintain consistent, up-to-date copies of primary data that enable quick resumption of operations upon discovery of corruption of the primary data or failure of the primary node.

SUMMARY OF THE INVENTION

The present invention provides the ability to maintain up-to-date, consistent copies of primary data on a secondary node in an efficient, cost-effective manner using minimal network bandwidth. Up-to-date, consistent copies of primary data are maintained without the need to replicate modified data when the data were modified as a result of an operation that is not an application-driven write operation captured during replication. Selected storage management operations are performed on the primary and secondary data stores at points in time when the data are the same to ensure that the data stored within remain consistent. For operations that make large-scale changes to data, such as reorganizing data stored on a disk or restoring data from a copy of the data made at an earlier point in time, avoiding copying the modified data to a secondary data store saves time and money.

These selected storage management operations include operations that produce modified data stored in the primary data store, where the modified data are not replicated to a secondary node. For example, restoration of data from a snapshot volume is an operation that affects data stored in the primary data store, but where the modified data resulting from the restoration are not replicated.

Other storage management operations are selected to be performed on both the primary and secondary data stores, where the operations are a type of operation that does not directly change data in the primary data store, but may have an effect on data stored in the primary data store. For example, a configuration change such as creation of a snapshot volume does not affect data stored in the primary data store, but rather makes a copy of that data. However, if the snapshot volume were later used to restore data in the primary data store, and a copy of the snapshot volume is not present in the secondary data store at that time, data in the primary and secondary data stores become inconsistent. Therefore, an operation creating a snapshot is included in the operations selected to be performed on the secondary data store. The present invention ensures that a secondary snapshot volume containing a copy of the data used to restore the primary data store is available to be used to restore the copy of the data in the secondary data store. By providing the same data in the primary and secondary data stores, it is possible to avoid replicating each data item changed during the restoration.

BRIEF DESCRIPTION OF THE DRAWINGS

The present invention may be better understood, and its numerous objectives, features, and advantages made apparent to those skilled in the art by referencing the accompanying drawings.

FIG. 3A shows a series of updates to data followed by creation of a snapshot of primary data.

FIG. 3B shows another series of updates to data occurring after the snapshot of FIG. 3A is created.

FIG. 3C shows replication of the data resulting from the updates of FIGS. 3A and 3B and a command inserted into the replication stream.

FIG. 3D shows arrival of the command of FIG. 3C at the secondary node.

FIG. 3E shows creation of a snapshot on the secondary node in response to execution of the command at the secondary node.

FIG. 3F shows the system after all updates of FIGS. 3A and 3B are written to storage on the secondary node.

The use of the same reference symbols in different drawings indicates similar or identical items.

DETAILED DESCRIPTION

Figure 1:
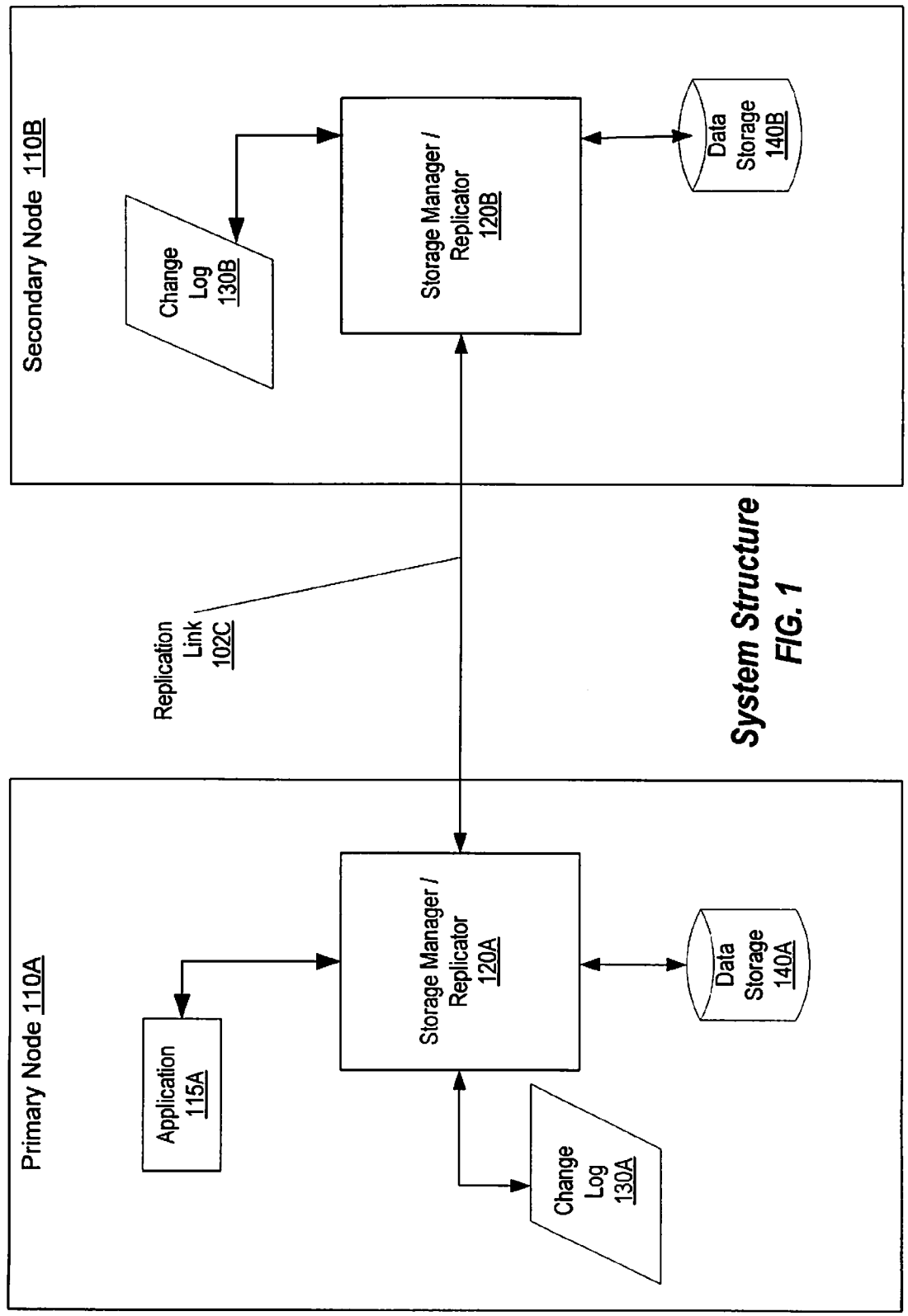
FIG. 1 shows an example of a system environment in which the present invention may operate.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Terminology

The terms "consistent" and "consistency" are used herein to describe a backup copy of data that is either an exact copy of the data or accurately represents a state of the data as the data existed at a previous point in time. To accurately represent a state of the data as the data existed at a previous point in time, while write operations and replication of the data are ongoing, the term "consistency" is used to indicate that the backup copy includes the data produced by all write operations that had completed at the previous point in time. In addition, to be consistent, the backup copy cannot include the data produced by write operations that had not yet begun at that previous point in time. Determining consistency for data produced by write operations that were in progress at the previous point in time is discussed in the following paragraph.

Data being written by write operations that were in progress and updating different data concurrently at the previous point in time can be considered to be consistent when the backup copy either includes, partially includes, or excludes all of the data being written by in-progress write operations. For example, consider that blocks 1 through 4 contain values 'AAAA' and concurrent write operations are in progress to change the values of blocks 1 and 2 to 'BB' when the primary node fails. Data in blocks 1-4 can be considered to be consistent with a backup copy having values of 'AAAA' (indicating that neither write operation completed prior to the previous point in time), 'BAAA' (indicating that the write operation to block 1 completed prior to the previous point in time but the write operation to block 2 did not), 'ABAA' (indicating that the write operation to block 2 completed prior to the previous point in time but the write operation to block 1 did not), or 'BBAA' (indicating that both write operations completed prior to the previous point in time).

While only one of these four scenarios can occur at a time, each scenario represents a valid possible state of the primary data, depending upon the timing of execution of the write operations, and therefore can be considered to be consistent. To ensure strict consistency of the data during replication such that the secondary data is an exact copy of a previous state of the primary data, some implementations may block write operations for a brief period of time to allow in-progress write operations to complete before replicating the results of those write operations.

The terms "write operation" and "update operation" are used interchangeably to describe making a change to data. The terms "change" and "modification," when used with reference to data, include adding new data as well as updating existing data. The terms "change" and "modification," when used with reference to a configuration of data storage, include changing an existing configuration and/or adding a new configuration.

Data storage may take form as groups of one or more physical devices, such as one or more dynamic or static random access storage devices, one or more magnetic or optical data storage disks, or one or more other types of storage devices. With respect to backup copies of primary data, preferably the backup storage devices are direct access storage devices such as disks rather than sequential access storage devices such as tapes. Because disks are often grouped to form a logical storage volume that is used to store backup copies of primary data, the terms "storage," "data storage," and "data store" are used interchangeably herein with "volume" and "storage volume;" however, one of skill in the art will recognize that the systems and processes described herein are also applicable to other types of storage and that the use of the term "volume" is not intended to be limiting. A storage volume storing the primary data is referred to herein as a primary volume, and a storage volume storing a backup copy of the primary data is referred to herein as a backup volume, secondary volume, or remote volume. A storage volume storing a snapshot of data is referred to herein as a snapshot volume.

The terms "host" and "node" are used interchangeably to describe computer systems, which are described in the discussion of FIG. 4 below. A node in a network managing the primary data/volume is referred to herein as a primary node, and a node in the network maintaining backup copies of the primary data but not the primary data itself is referred to herein as a secondary, backup, or remote node.

The term "portion of data" may include all of the data or only some and not all of the data. Similarly, the terms "set" or "subset" of operations may include all of the operations or only some, and not all, of the operations.

Introduction

The present invention provides the ability to maintain up-to-date, consistent copies of primary data on a secondary node in an efficient, cost-effective manner using minimal network bandwidth. Up-to-date, consistent copies of primary data are maintained without the need to replicate modified data when the data were modified as a result of an operation that is not an application-driven write operation captured during replication. Selected storage management operations are performed on the primary and secondary data stores at points in time when the data are the same to ensure that the data stored within the data stores remain consistent.

Every operation performed on the primary data store is not performed on the secondary data store to achieve consistency of the primary and secondary data; instead, only selected storage management operations are performed on both the primary and secondary data stores. The types of operations that are performed on both the primary and secondary data stores include operations that produce modified data stored in the primary data store, where the modified data are not replicated to a secondary node. For example, restoration of data from a snapshot volume is an operation that affects data stored in the primary data store, but where the modified data resulting from the restoration are not replicated.

Other types of storage management operations are selected to be performed on both the primary and secondary data stores, where the operations do not directly change data in the primary data store, but may have an effect on data stored in the primary data store. For example, a configuration change, such as creation of a snapshot volume, does not affect data stored in the primary data store, but rather makes a copy of that data, referred to as a snapshot. Snapshots need not be written to a physical storage device, and therefore may be a "virtual" copy in memory that can be used to reconstruct the state of the data in the primary data store. However, if the snapshot were later used to restore data in the primary data store, and a copy of the snapshot volume is not available at the secondary node to be used to restore the secondary data store at that time, data in the primary and secondary data stores become inconsistent or an expensive operation is necessary to restore consistency. An example of an operation to restore consistency is copying all data modified by the restoration operation to the secondary data store. The present invention ensures that a secondary snapshot volume containing a copy of the data used to restore the primary data store is available to be used to restore the data in the secondary data store. By providing the same data in the primary and secondary data stores, it is possible to avoid replicating each data item changed during the restoration.

Examples of operations that should be included in the set of operations include operations changing the size of the primary data store, making snapshots of the primary data store, making snapshots of snapshots, restoring snapshots, refreshing snapshots, and writing data to snapshot by an application. These operations should occur at the same respective points in time with reference to the data in the replication stream. Coordination of the ordering of write operations with the replication stream ensures that all write operations performed between two operations on the primary data store are applied to the secondary data store between the two operations on the secondary node, and thus are applied to the same data.

The state of having the same data in both the primary and secondary data stores can be represented as a "snapshot tree," where every copy (snapshot) of the primary data on the primary node has a corresponding copy (snapshot) of the same data on the secondary node. By performing the same operations on snapshot trees containing the same data, replication of modified data can be avoided when the modified data are produced by an operation and not captured during replication. As mentioned above, snapshots need not be written to a physical storage device, and therefore may be a "virtual" copy in memory that can be used to reconstruct the state of the primary data.

FIG. 1 shows an example of a system environment in which the present invention may operate. Two nodes are shown, primary node 110A and secondary node 110B. Software programs application 115A and storage manager/replicator 120A operate on primary node 110A. Application 115A manages primary data that can be stored in change log 130A and data storage 140A.

Change log 130A can be considered to be a "staging area" to which changes to data are written before being written to data storage 140A. Change logs such as change log 130A, also referred to simply as logs, are known in the art and can be implemented in several different ways; for example, an entry in the log may represent an operation to be performed on a specified region of the data. Alternatively, the log may be structured to maintain a set of operations with respect to each region. Other types of log structures are also possible, and no particular type of implementation of change logs is required for operation of the invention. The invention can be practiced without using a log, as long as write operations are performed such that the data remain consistent.

Storage manager/replicator 120A intercepts write operations to primary data by application 115A and replicates changes to the primary data to secondary node 110B. The type of replication performed by storage manager/replicator 120A can be synchronous, asynchronous, and/or periodic, as long as updates are applied such that the data in the secondary data storage are consistent with the data in the primary data storage. While application 115A and storage manager/replicator 120A may run on the same computer system, such as primary node 110A, the hardware and software configuration represented by primary node 110A may vary. Application 115A and storage manager/replicator 120A may run on different computer systems, change log 130A may be stored in non-persistent or persistent data storage, and data storage 140A is a logical representation of a set of data stored on a logical storage device which may include one or more physical storage devices.

Furthermore, while connections between application 115A, storage manager/replicator 120A, change log 130A, and data storage 140A are shown within primary node 110A, one of skill in the art will understand that these connections are for illustration purposes only and that other connection configurations are possible. For example, one or more of application 115A, storage manager/replicator 120A, change log 130A, and data storage 140A can be physically outside, but coupled to, the node represented by primary node 110A.

Secondary data storage 140B is logically isolated from primary data storage 140A, and may be physically isolated as well, although physical isolation is not a requirement to practice the invention. Storage manager/replicator 120A of primary node 110A communicates over replication link 102C with storage manager/replicator 120B of secondary node 110B. Secondary node 110B also includes a change log 130B and data storage 140B for storing a replica of the primary data, and similar variations in hardware and software configuration of secondary node 110B are possible.

Because storage manager/replicator 120A is configured to intercept write operations by application 115A to primary data and to replicate the changed data, modifications to primary data made as a result of performing other operations not involving application 115A (such as reformatting disks in data storage 140A) may not be replicated. Such operations are further discussed with reference to FIG. 2.

Figure 2:
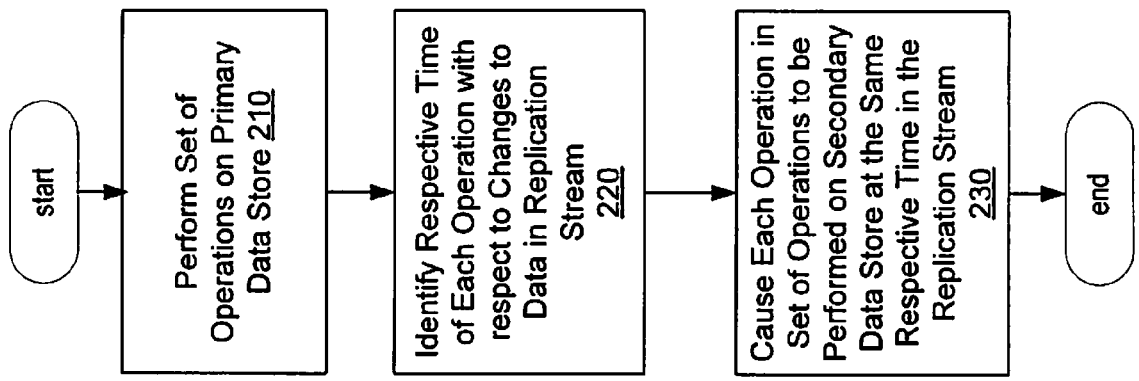
FIG. 2 is a flowchart of one example of a method for maintaining consistent and up-to-date copies of primary data on secondary nodes.

FIG. 2 is a flowchart of one example of a method for maintaining consistent and up-to-date copies of primary data on secondary nodes. In "Perform Set of Operations on Primary Data Store" step 210, a set of one or more operations is performed on a primary data store. Each operation in the set of operations either modifies data stored in the primary data store or modifies a configuration of the primary data store. The set of operations is performed during copying of selected data (e.g., replication) from the primary data store to at least one secondary data store. Every operation performed on the primary data store is not also performed on the secondary data store; only selected operations are included in the set of operations.

If a given operation modifies data in the primary data store, in one embodiment, the modified data are copied to the secondary data store only if the modified data are not captured during the copying (replication) of the selected data from the primary data store to the secondary data store(s). It is within the scope of the invention, however, that a portion, but not all, of the modified data is also replicated from the primary data store to the secondary data store(s).

If a given operation modifies only a configuration of the primary data store, the given operation is performed on the secondary data store if the operation is a selected type of operation that may later affect data in the primary data store. As an example of such a configuration change, a snapshot volume may be created. The invention further includes causing the set of operations to be performed on the secondary data store such that the data in the primary data store and the secondary data store are consistent. For example, if the set of operations produces modified data and the modified data are not included in the selected data copied to the second data store, a copy of the modified data is stored in the second data store after the set of operations is performed on the secondary data store. The data are consistent as a result of having the same data in both the primary and secondary data stores before each operation in the set of operations is performed. Consequently, the data are made consistent without copying each data item affected by the set of operations during replication.

This set of operations can be performed by, for example, storage manager/replicator 120A of FIG. 1. Storage manager/replicator 120A serves as an example of a performing module, means, or instructions for performing a set of operations on a primary data store, although other implementations of a performing module, means, or instructions are within the scope of the present invention. An example of such a commercially-available storage manager/replicator that can provide the functionality of the performing module, means, or instructions is the combination of the Veritas Volume Manager® and Veritas Volume Replicator® products available from Veritas Software Corporation of Mountain View, Calif.

From "Perform Set of Operations on Primary Data Store" step 210, control proceeds to "Identify Respective Time of Each Operation with respect to Changes to Data in Replication Stream" step 220. The time of each operation with respect to changes made in the replication stream can be used to ensure proper sequencing of each update to the data in the secondary data storage for maintaining consistency with the data in the primary data storage. One technique for identifying the time of the operation with respect to the changes to data in the replication stream is discussed below with reference to FIGS. 3B and 3C.

From "Identify Respective Time of Each Operation with respect to Changes to Data in Replication Stream" step 220, control proceeds to "Cause Each Operation in the Set of Operations to be Performed on Secondary Data Storage at the Same Respective Time in the Replication Stream" step 230. As noted above, to maintain consistency of the data in the primary data storage and secondary data storage, the operation should be performed such that changes to the configuration or data are made at the same respective time (e.g., in the same order) on the secondary data storage that the changes were made to the primary data storage.

Storage manager/replicator 120A serves as an example of a causing module, means, or instructions for causing the set of operations to be performed on secondary data storage such that the second data includes modified data produced by the set of operations, although other implementations of a causing module, means, or instructions are within the scope of the present invention. As noted earlier, an example of a commercially-available storage manager/replicator is the combination of the Veritas Volume Manager® and Veritas Volume Replicator® products available from Veritas Software Corporation of Mountain View, Calif.

Storage manager/replicator 120A can also be considered as an example of other types of modules, means, and instructions, including a snapshot creation module, means, or instructions to create a snapshot and create a corresponding snapshot of the secondary data storage; a restoration module, means or instructions to restore a portion of the primary data storage from a snapshot of the primary data storage and cause a corresponding portion of the secondary data storage to be restored from a corresponding snapshot; an inserting module, means or instructions to insert a command to perform the operation; a sending module, means or instructions to send a command to perform the operation; and a synchronization module, means or instructions to synchronize two snapshots of the primary data and cause a corresponding two snapshots of the secondary data to be synchronized. Modules, means, and instructions can be implemented by storage manager/replicator 120A to perform other functions as well. Alternatively, the functionality described above with reference to storage manager/replicator 120A can be implemented as separate storage manager and replication modules or otherwise differently from the implementation described above.

FIGS. 3A-3F show a series of actions occurring in the system of FIG. 1A. Various updates to data are shown, along with creation of snapshot volumes of both primary data storage and secondary data storage such that the resulting snapshots are identical.

Figure 3A:
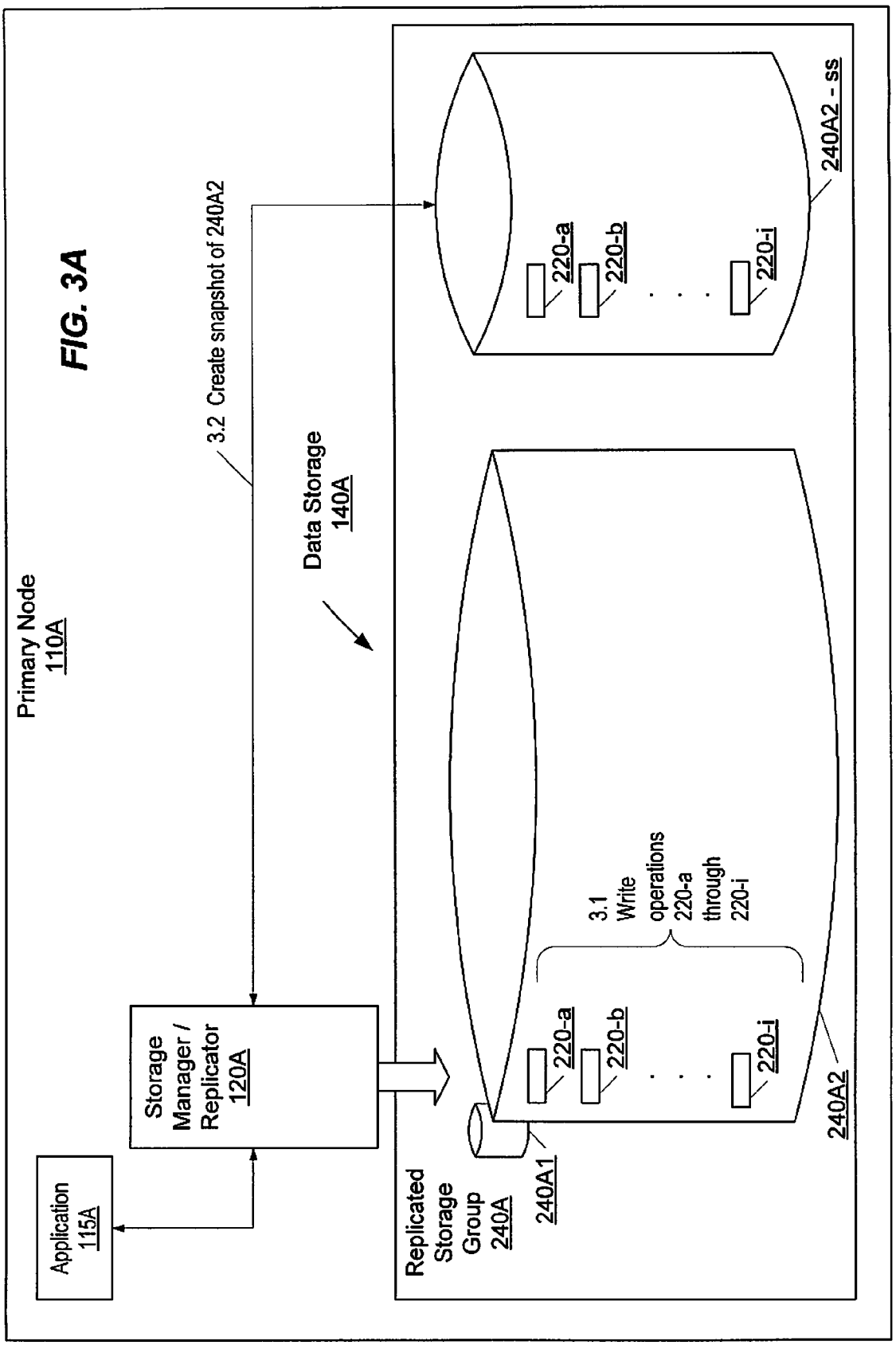
FIGS. 3A-3F show a series of actions occurring in the system of FIG. 1.

FIG. 3A shows a series of updates to data in primary storage, followed by creation of a snapshot of primary data. In action 3.1, application 115A performs a set of operations producing updates (also referred to as results of write operations or modified data) via storage manager/replicator 120A to volume 240A2 of replicated storage group 240A on primary node 110A. These updates include updates 220-a through 220-i, with each update occurring in sequential (alphanumeric) order. The set of updates is also referred to herein as a replication stream. In action 3.2, a corresponding snapshot 240A2-ss of volume 240A2 is made. Creation of snapshot 240A2-ss is an operation that affects the configuration of primary data storage 140A, which includes replicated storage group 240A. Snapshot 240A2-ss contains data resulting from the set of updates 220-a through 220-i.

Figure 3B:
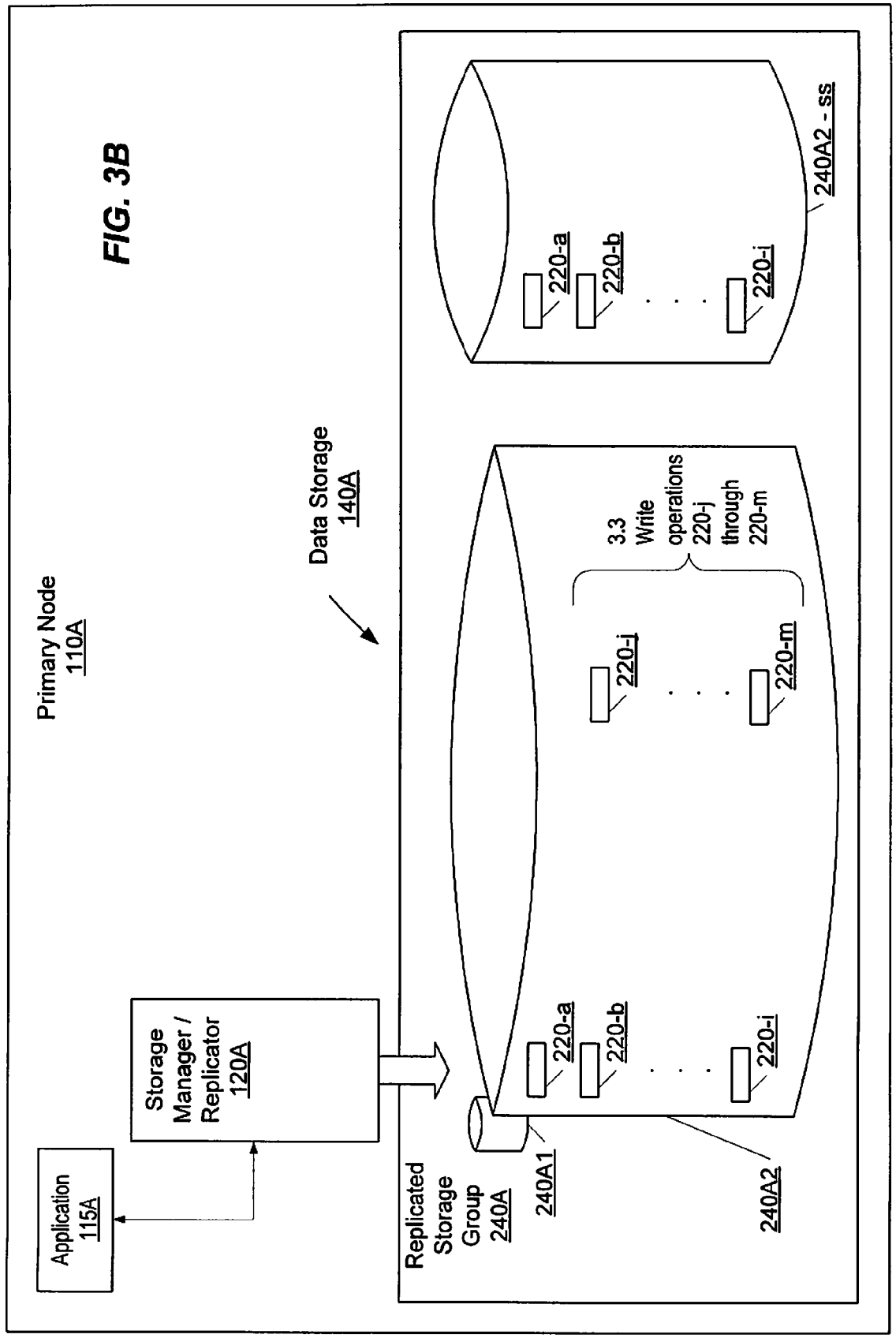

FIG. 3B shows another set of updates occurring after the snapshot of FIG. 3A is created. Action 3.3 shows a set of updates 220-j through 220-m to volume 240A2. As shown in the example, update 220-i is the result of the last write operation before the snapshot operation creating snapshot 240A2-ss, and update 220-j is the result of the first write operation after the snapshot operation.

Figure 3C:
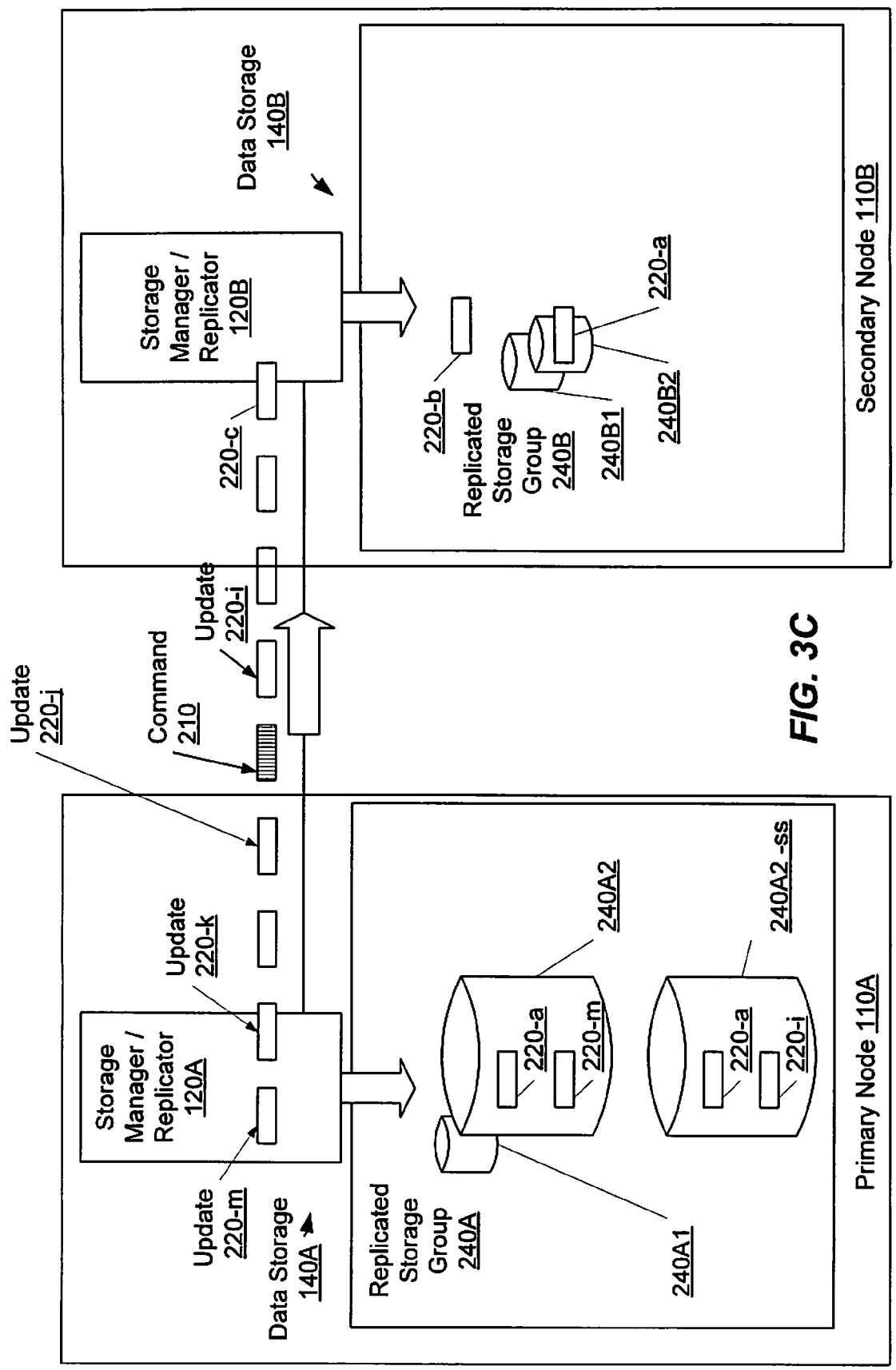

FIG. 3C shows replication of the data resulting from the updates of FIGS. 3A and 3B and a command inserted into the replication stream. Primary storage volume 240A2 shows that all updates 220-a through 220-m have been written. As the data pass from application 115A through storage manager/replicator 120A to volume 240A2, storage manager/replicator 120A captures the result of each write operation for replication. The replication stream from storage manager/replicator 120A on primary node 110A and storage manager/replicator 120B on secondary node 110B is shown. Update 220-a is shown within volume 240B2 of secondary node 110B, having been replicated as the result of the first write operation of the replication stream. Update 220-b is shown being communicated between storage manager/replicator 120B and volume 240B2, and update 220-c is shown arriving at storage manager/replicator 120B.

Updates after 220-c and through 220-i are shown in transit between primary node 110A and secondary node 110B, followed by a command 210. Command 210 is an instruction to perform a snapshot creation operation and is inserted in the replication stream at a location to ensure that each update to primary data storage and secondary data storage is made in the same order. Updates 220-j through 220-m are shown being replicated after command 210 in the replication stream. While additional updates after update 220-m are not shown, it is not necessary to discontinue updates to primary node 110A until secondary node 110B is synchronized. Replication can continue as operations to synchronize data in primary data storage and secondary data storage are performed. However, it is also within the scope of the invention to halt replication, wait for all updates to be replicated to the secondary data storage, perform the operation when all updates have been replicated, and then resume replication.

Figure 3D:
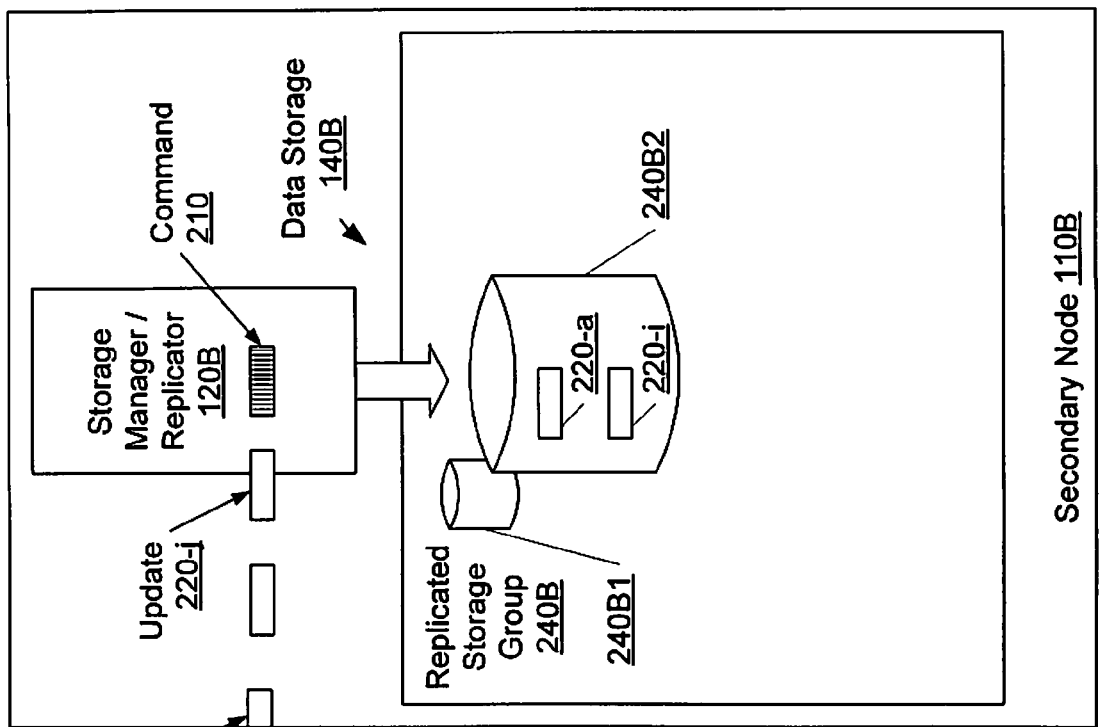
Figure 3D:
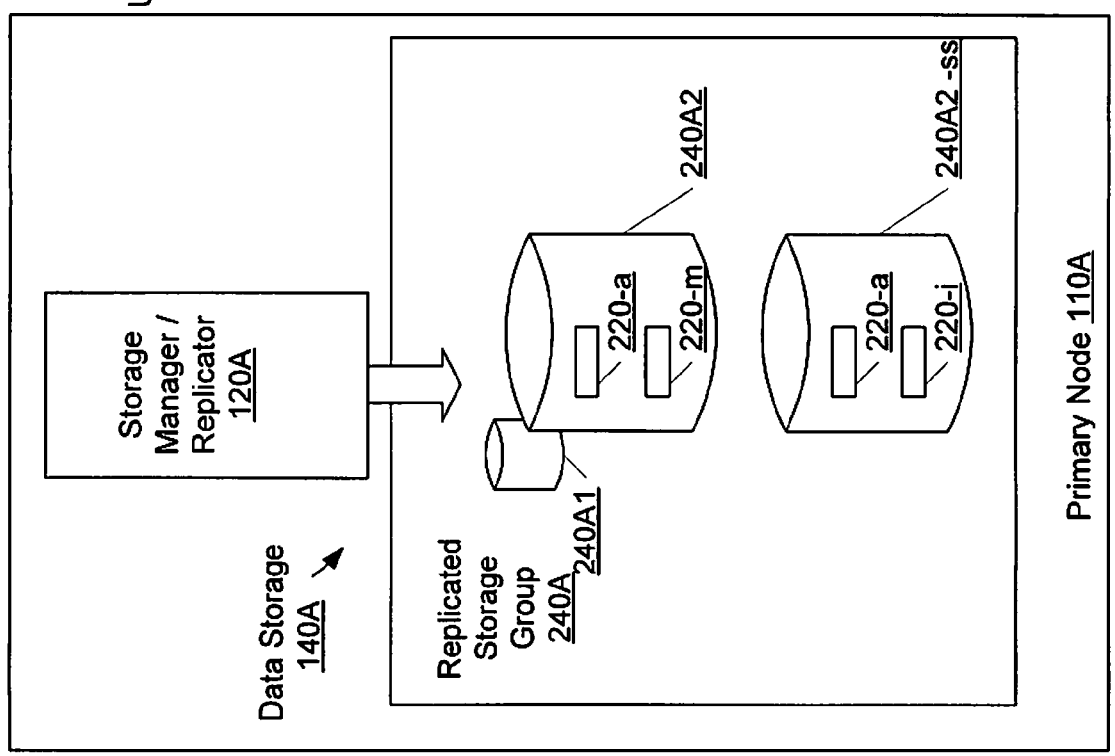

FIG. 3D shows arrival of command 210 at the secondary node. Updates 220-a through 220-i are now stored in secondary data storage 240B2. After command 210, in-transit updates follow, including update 220-j through update 220-m.

Figure 3E:
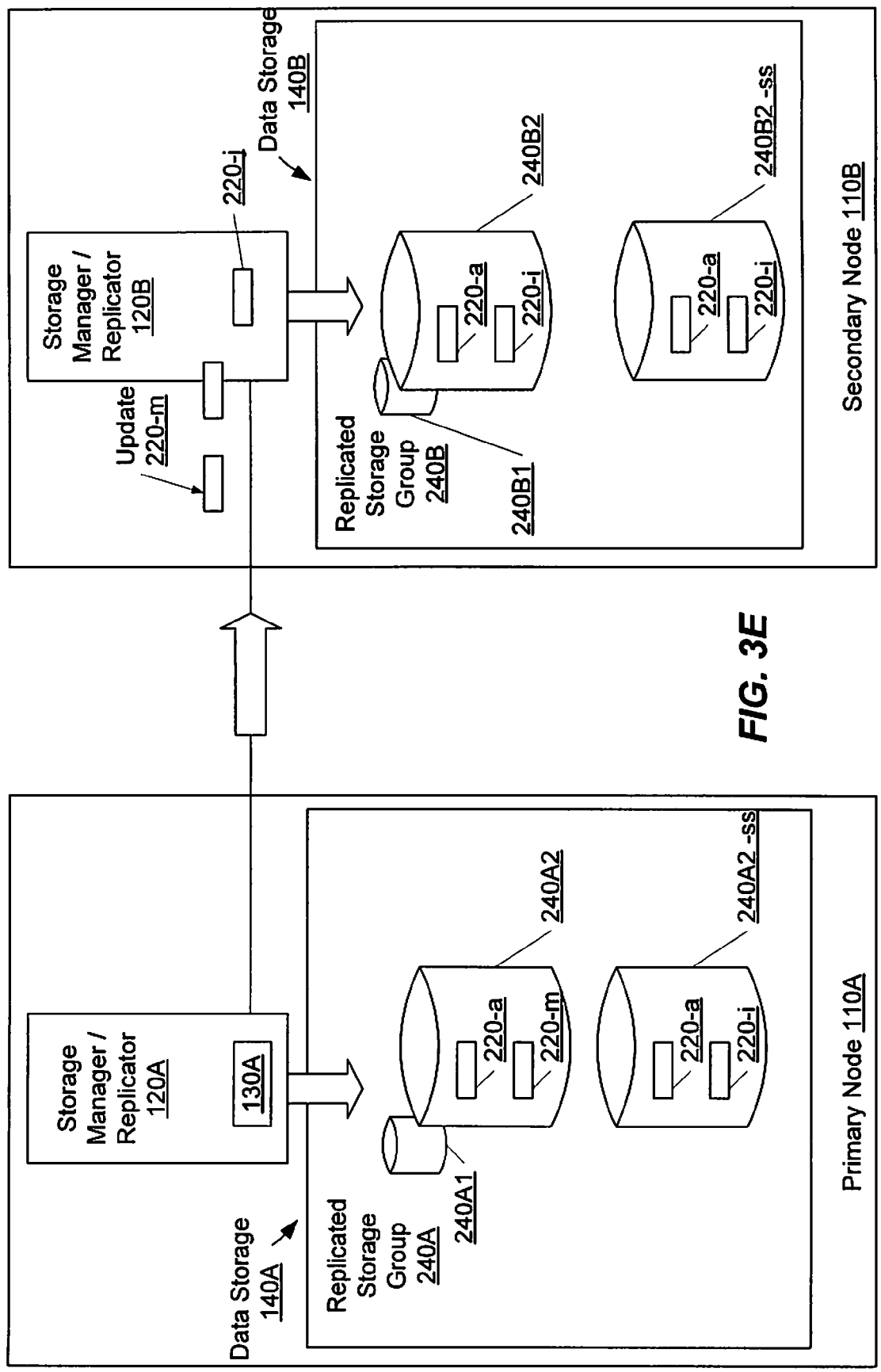

FIG. 3E shows creation of a snapshot on the secondary node in response to execution of command 210 at secondary node 110B. Snapshot volume 240B2-ss has been created, containing updates 220-a through 220-i. Updates 220-j through 220-m are in the process of being replicated to volume 240B2 on secondary node 110B.

Figure 3F:
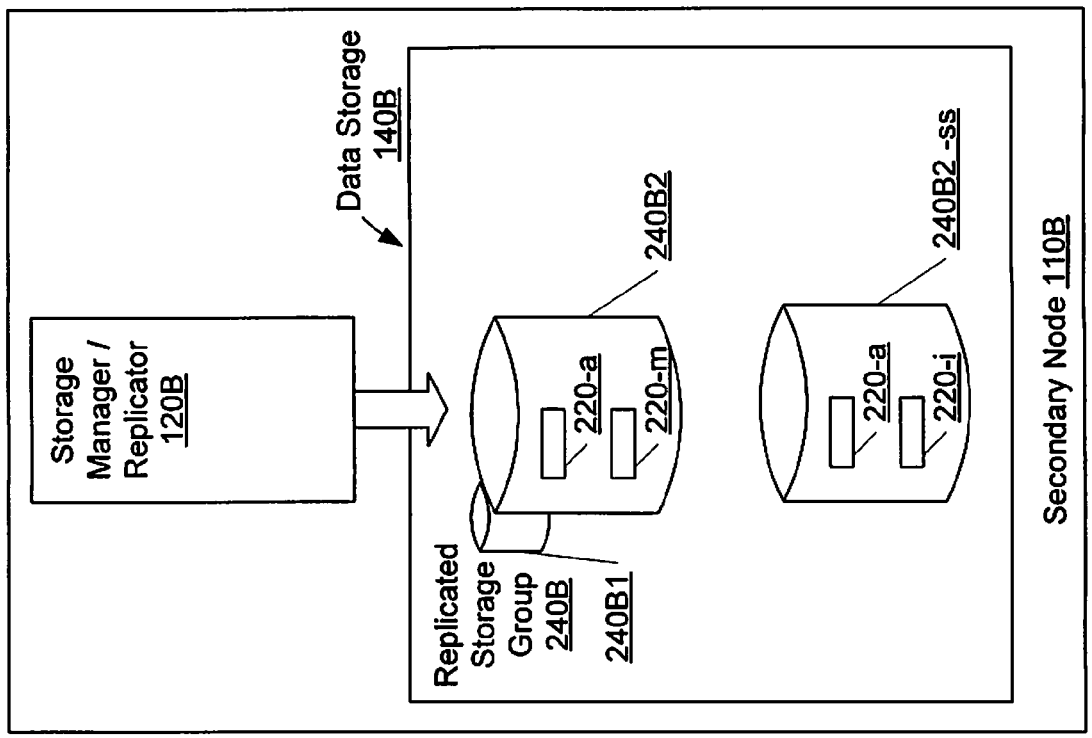
Figure 3F:
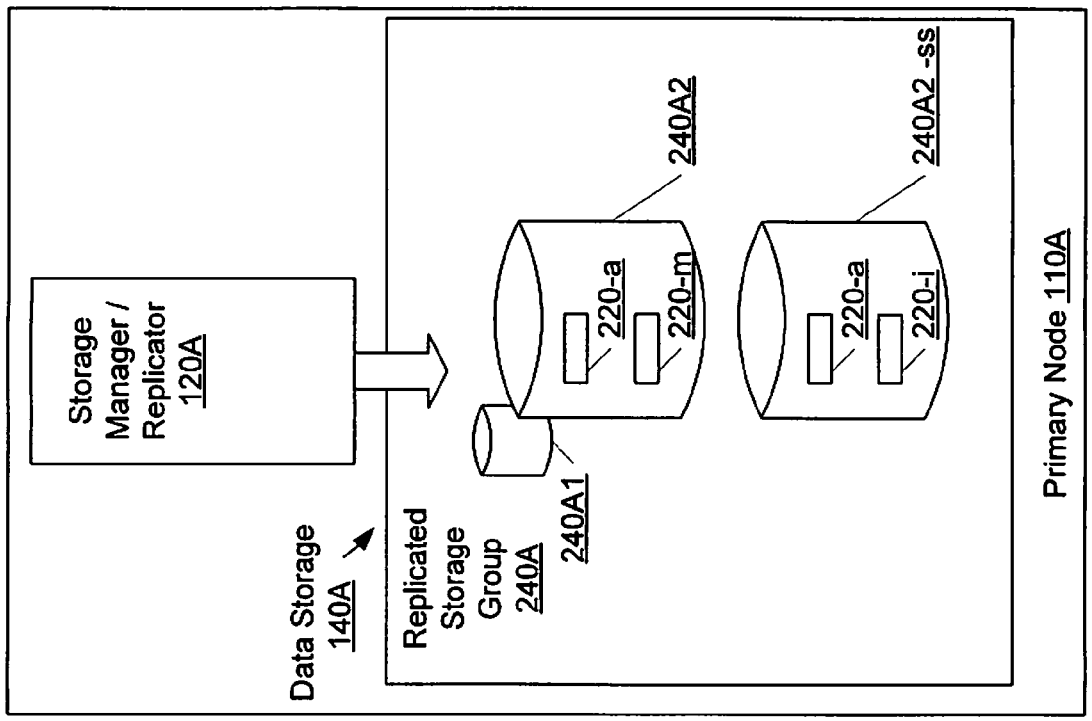

FIG. 3F shows the system after all updates of FIGS. 3A and 3B are written to storage on the secondary node. Volume 240B2 on secondary node 110B contains each of updates 220-a through 220-m and is a replica of volume 240A2 on primary node 110A. Snapshot volume 220B2-ss on secondary node 110B contains updates 220-a through 220-i and is a replica of snapshot volume 220A2-ss on primary node 110A. As a result of inserting command 210 in the replication stream between the last operation before creation of snapshot volume 240A2-ss and the first operation afterwards, snapshot volume 240B2-ss has been created as an exact replica of snapshot volume 240A2-ss. This process is made more efficient, as there is no need to send data across the network in addition to the data already being replicated as part of the replication stream. Insertion of a single command enables creation of a replica on the secondary node 110B without replicating portions of the data again.

When the operation makes a snapshot of the primary data storage, causing the operation to be performed on the secondary data storage includes making a corresponding snapshot of the secondary data storage. After the operation is performed on the secondary data storage, the snapshot of the first data storage contains first data, and the corresponding snapshot of the second data storage contains a replica of the first data.

When the operation restores a portion of the data from another backup copy of the primary data storage, a corresponding portion of the data in the second data storage is restored from a corresponding backup copy of the data storage. For example, if primary data are restored from a snapshot on the primary node, the copy of the primary data on the secondary node is restored from a corresponding copy of the snapshot that resides on the secondary node. By ensuring that each operation of the set of operations on the primary node also occurs on the secondary node, including creation of snapshots, a corresponding copy of the snapshot also resides on the secondary node. The corresponding snapshot in the secondary data storage is a replica of the snapshot in the first data storage and thus can be used to perform the restoration of the secondary data storage with identical data.

When the operation synchronizes two snapshots of the primary data storage, causing the operation to be performed on the secondary data storage includes synchronizing a corresponding first snapshot and a corresponding second snapshot of the secondary data storage. If the first snapshot of the primary data storage contains first data, the corresponding first snapshot of the second data storage contains a replica of the first data after the synchronization of the secondary data storage. Similarly, if the second snapshot of the first data storage contains second data, the corresponding snapshot of the second data storage contains a replica of the second data after the synchronization of the secondary data storage.

In one embodiment, upon failure of a node associated with the primary data storage, a pending change of the set of changes designated for replication is identified if the pending change has not been made in the secondary data storage. The pending change is then made in the secondary data storage.

In at least one embodiment, when the snapshot volume is created on the secondary node, a replication relationship is established between the primary snapshot volume and the corresponding snapshot volume on the secondary node. Establishing a replication relationship causes a change to data in the primary snapshot to be included in selected snapshot data copied to the corresponding snapshot on the secondary node. As a result of the replication relationship, the corresponding snapshot volume on the secondary node will remain synchronized with the primary snapshot volume, as each update made to the primary snapshot volume will be replicated to the corresponding snapshot volume on the secondary node.

One of skill in the art will recognize that corresponding snapshot volumes and replication relationships can be established on more than one secondary node. The techniques described above enable a large number of copies of primary data to be maintained, with updates to data being replicated only once to the secondary node(s) and commands being included in the replication stream to perform other operations, even operations changing the data.

When replication is performed periodically, such that a set of changes is replicated upon certain events or upon expiration of a set time interval, it may be desirable to cause the pending set of changes to be replicated upon the occurrence of each storage management operation. This will ensure that the same changes are applied to secondary data storage in the same order prior to performing the storage management operation on the secondary data storage.

A replication module replicating the set of changes to data from primary to secondary data storage may be performed by software external to the software performing the operation. It is desirable in such an implementation to configure the replication software so that the set of pending changes to data in primary data storage is made to secondary data storage before performing the operation on the secondary data storage.

Embodiment with Operations Performed at Approximately the Same Point in Replication In another embodiment of the invention, a command can be sent from primary node 110A to secondary node 110B at approximately the time that the operation is performed on primary node 110A, without necessarily ensuring that the command is executed at the exact point in the replication stream, as long as updates are performed in the same order on the primary and secondary nodes. Other mechanisms can be used to ensure that commands are issued at approximately the same point in time without inserting the command into the replication stream. For example, a pair of snapshots can be created in primary and secondary data storage at approximately the same time.

In this example of the embodiment, a second set of changes to the primary data can occur after the snapshot is created on the primary data storage and before the snapshot creation operation on the secondary data storage. For example, the second set of changes may have been logged for replication but not yet replicated. The second set of changes is identified as changes that should be made in the secondary data storage so that the data in the primary and secondary data storage are consistent. Once the pair of snapshots is established, the two snapshots can be synchronized very quickly by identifying regions of data having differences between the two snapshots and replicating data from the primary to the secondary snapshot only for the identified regions. This synchronization operation ensures that the second set of changes is made to the secondary data storage so that it is consistent with the primary data storage.

A technique for synchronizing two snapshot volumes is described in U.S. patent application Ser. No. 10/610,603, filed on Jul. 1, 2003, entitled "Flexible Hierarchy of Relationships and Operations in Data Volumes," and naming as inventors Anand A. Kekre, John A. Colgrove, Oleg Kiselev, Ronald S. Karr, and Niranjan S. Pendharkar, the application being incorporated by reference herein in its entirety and for all purposes.

Embodiment with Separate Security Domains

In yet another embodiment, separate security domains can be established for the primary and secondary nodes so that a user or process performing an operation on the primary data storage must pass through an additional security barrier to perform the same operation on the secondary data storage. Usually, when the reasons for replication are high availability and disaster resiliency, the secondary data store is physically isolated from the primary data store and the primary and secondary data stores are managed by separate nodes. Normally, a primary node can access all mirrored copies of the primary data, and inaccessible secondary data means that read operations must be performed on the primary data itself (or on a copy of the data at the primary node). When considered from the point of view of data security, however, inaccessibility of secondary data by the primary node provides an additional security barrier to protect backup copies of the data from corruption. If the primary data are compromised by a malicious intruder, administrator mistake, or malfunctioning software or hardware, only locally accessible storage is directly jeopardized. To also corrupt the backup data, the additional security barrier must be overcome and the destructive actions corrupting the data must be repeated.

Referring again to FIG. 1, the system structure for an embodiment with separate security domains is designed such that primary node 110A can operate within a separate security domain than secondary node 110B. Replication link 102C can be configured to allow access only by storage managers/replicators 120A and 120B and not by application 115A or other processes running on primary node 110A. Access accounts for the primary node 110A and secondary node 110B can be configured with different passwords, particularly system management and privileged accounts. Because storage manager/replicator 120A is configured to intercept write operations by application 115A to primary data and to replicate the changed data, changes to primary data made as a result of performing other destructive actions not involving application 115A (such as reformatting disks in data storage 140A) may not be replicated.

As additional security features, the system can be designed such that replication link 102C is the only communication link between security domains for primary nodes 110A and 110B. The system can also be configured such that only data conforming to protocols used by storage managers/replicators 120A and 120B are transmitted across replication link 102C. When primary and secondary data storage 140A and 140B are connected via a Storage Area Network (SAN, not shown), the system can be configured to implement the primary and secondary data storage 140A and 140B as portions of two different physical networks to provide an additional security barrier.

In this embodiment with separate security domains, primary node 110A does not have direct access to data storage 140B. To access data on secondary node 110B, primary node 110A requests the data from secondary node 110B and performs operations on the data in primary data storage 140A. Storage manager/replicator 120A then replicates updates over replication link 102C to storage manager/replicator 120B.

A technique for maintaining primary data and secondary data in separate security domains is described in U.S. patent application Ser. No. 10/699,475, filed on Oct. 31, 2003, entitled "Synchronous Replication for System and Data Security," and naming as inventor Oleg Kiselev, the application being incorporated by reference herein in its entirety and for all purposes.

The above-described embodiments of the invention can be implemented in a variety of computing and networking environments. An example computing environment that can be used to implement the invention is described below with reference to FIG. 4.

An Example Computer System

Figure 4:
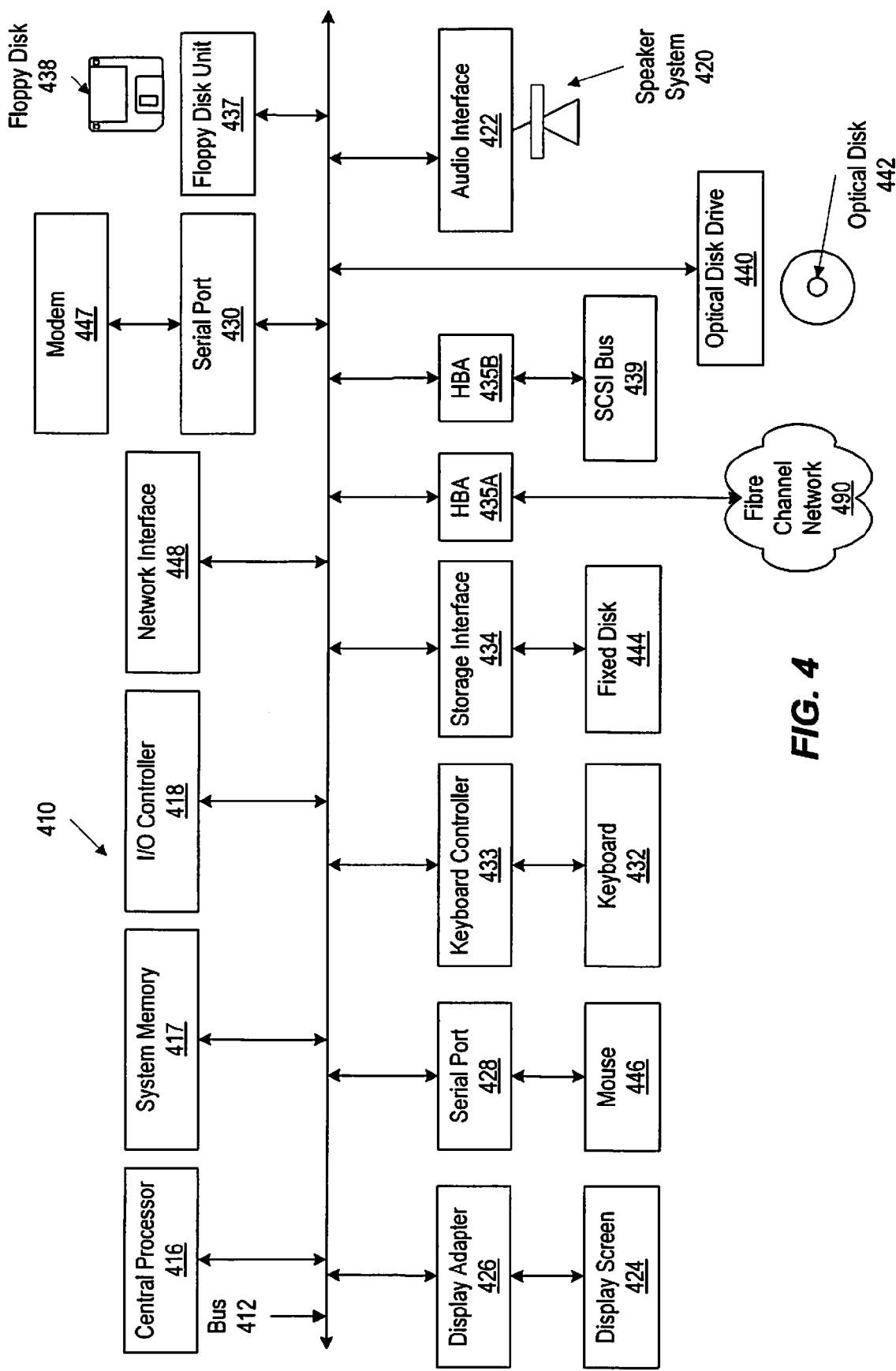
FIG. 4 is an example configuration of a computer system that can be used to operate the present invention.

FIG. 4 is a block diagram of a computer system 410 suitable for implementing the present invention. Computer system 410 includes a bus 412 which interconnects major subsystems of computer system 410, such as a central processor 414, a system memory 417 (typically RAM, but which may also include ROM, flash RAM, or the like), an input/output controller 418, an external audio device, such as a speaker system 420 via an audio output interface 422, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a fibre channel network 490, a host bus adapter (HBA) interface card 435B operative to connect to a SCSI bus 439, and an optical disk drive 440 operative to receive an optical disk 442. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), floppy disk unit 437 or other storage medium. Additionally, applications may be in the form of electronic signals modulated in accordance with the application and data communication technology when accessed via network modem 447 or interface 448.

Storage interface 434, as with the other storage interfaces of computer system 410, may connect to a standard computer readable medium for storage and/or retrieval of information, such as a fixed disk drive 444. Fixed disk drive 444 may be a part of computer system 410 or may be separate and accessed through other interface systems. Modem 447 may provide a direct connection to a remote server via a telephone link or to the Internet via an internet service provider (ISP). Network interface 448 may provide a direct connection to a remote server via a direct network link to the Internet via a POP (point of presence). Network interface 448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 4 to be present to practice the present invention. The devices and subsystems may be interconnected in different ways from that shown in FIG. 4. The operation of a computer system such as that shown in FIG. 4 is readily known in the art and is not discussed in detail in this application. Code to implement the present invention may be stored in computer-readable storage media such as one or more of system memory 417, fixed disk 444, optical disk 442, or floppy disk 438. Additionally, computer system 410 may be any kind of computing device, and so includes personal data assistants (PDAs), network appliances, X-window terminals or other such computing devices. The operating system provided on computer system 410 may be MS-DOS®, MS-WINDOWS®, OS/2®, UNIX®, Linux®, or another known operating system. Computer system 410 also supports a number of Internet access tools, including, for example, an HTTP-compliant web browser having a JavaScript interpreter, such as Netscape Navigator®, Microsoft Explorer®, and the like.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   performing a set of operations on a first data store, wherein
      the set of operations is performed by a storage manager,
      the first data store comprises selected data written by an application,
      each operation of the set of operations on the first data store performs at least one of producing modified data from data in the first data store, and changing a configuration of the first data store,
      the producing the modified data occurs at a specified point in a sequential order on the first data store,
      the specified point is between a first respective point in the sequential order and a second respective point in the sequential order,
      the first respective point and the second respective point are adjacent in the sequential order, and
      the performing the set of operations occurs during copying of the selected data in the first data store to a second data store; and
   causing the set of operations to be performed on the second data store in the sequential order, wherein
      if the set of operations produces the modified data and a portion of the modified data is not included in the selected data copied to the second data store, the second data store comprises a copy of the portion of the modified data after the set of operations is performed on the second data store by virtue of the performing the set of operations on the second data store, and
      the causing the set of operations to be performed on the second data store comprises producing the copy of the modified data at the specified point in the sequential order on the second data store.

2. The method of claim 1 wherein
   one operation of the set of operations restores a portion of first data in the first data store from third data in a third data store; and
   the causing the set of operations to be performed on the second data store comprises
      causing a corresponding portion of second data in the second data store to be restored from fourth data in a fourth data store, wherein
         the portion of the first data and the portion of the second data are the same after the restoring the portion of the first data and after the causing the corresponding portion of the second data to be restored.

3. The method of claim 1 wherein
   one operation of the set of operations synchronizes first data in the first data store with third data in a third data store; and
   the causing the set of operations to be performed on the second data store comprises
      causing second data in the second data store to be synchronized with fourth data in a fourth data store corresponding to the third data store, wherein
         the first data and the second data are the same after the synchronizing the first data and after the causing the second data to be synchronized.

4. The method of claim 1 wherein
   one operation of the set of operations changes the configuration of the first data store by creating a first snapshot data store related to the first data store wherein
      a first snapshot of first data in the first data store is stored in the first snapshot data store; and
   the causing the set of operations to be performed on the second data store comprises causing a second snapshot data store related to the second data store to be created, wherein
      a second snapshot of second data in the second data store is stored in the second snapshot data store, and
      the first snapshot and the second snapshot comprise data that are the same.

5. The method of claim 4 further comprising:
   establishing a replication relationship between the first snapshot data store and the second snapshot data store after the second snapshot data store is created, wherein
      the replication relationship causes subsequently modified data in the first snapshot data store to be included in selected snapshot data copied to the second snapshot data store, and
      the subsequently modified data are copied to the second snapshot data store when the selected data are copied to the second data store.

6. The method of claim 1 wherein
   if at a first point in time during the performing the set of operations,
      a first operation of the set of operations is performed on the first data store, and
      the first data store comprises first data when the first operation is performed on the first data store, then
   at a second point in time,
      when the first operation is performed on the second data store,
         the second data store comprises a copy of the first data.

7. The method of claim 1 wherein
   if at a first point in time during the performing the set of operations,
      the first data store comprises first data, then
   at a second point in time,
      when the second data store represents the first data store at the first point in time,
         the second data store comprises a copy of the first data.

8. The method of claim 1 wherein
   the set of operations comprises:
      an ordered subset of the set of operations, wherein
         operations in the ordered subset of operations are performed on both the first data store and the second data store in a sequential order.

9. The method of claim 1 wherein
   the causing the producing the copy of the modified data to occur at the specified point comprises inserting a command in the selected data copied from the first data store to the second data store to produce the copy of the modified data at the specified point.

10. The method of claim 1 wherein
the subset of ordered operations comprises
all operations in the set of operations.

11. The method of claim 1 wherein
the set of operations further comprises:
an unordered subset of the set of operations, wherein
the unordered subset is performed at a specified point in the sequential order,
the specified point in the sequential order is between a first respective point in the sequential order and a second respective point in the sequential order,
the first respective point is adjacent in the sequential order to the second respective point, and
each operation in the unordered subset can be performed concurrently with respect to other operations in the unordered subset.

12. The method of claim 1 wherein
the causing the set of operations to be performed on the second data store comprises
causing at least one command that performs the set of operations to be executed on the second data store.

13. The method of claim 1 wherein
the selected data comprises first data modified as a result of a write operation.

14. The method of claim 13 wherein
the set of operations does not include the write operation.

15. The method of claim 1 wherein
the selected data further comprise a portion of a snapshot of first data stored in the first data store, and
the portion of the snapshot is modified as a result of a write operation.

16. The method of claim 15 wherein
the set of operations does not include the second write operation.

17. The method of claim 1 wherein
the second data store further comprises a copy of the selected data after copying the selected data to the second data store.

18. The method of claim 1 further comprising:
upon failure of a primary node associated with the first data storage,
identifying a portion of the selected data in the first data store, wherein
the portion has not been copied to the second data store, and
causing only the portion to be copied to the second data store such that the first data and the second data are the same.

19. A computer readable storage medium storing program instructions executable by one or more processors to implement a method comprising:
performing a set of operations on a first data store, wherein
the set of operations is performed by a storage manager,
the first data store comprises selected data written by an application,
each operation of the set of operations on the first data store performs at least one of producing modified data from data in the first data store, wherein
producing the modified data occurs at a specified point in a sequential order on the first data store,
the specified point is between a first respective point in the sequential order and a second respective point in the sequential order,
the first respective point and the second respective point are adjacent in the sequential order, and
changing a configuration of the first data store, and
the performing the set of operations occurs during copying of selected data in the first data store to a second data store; and
causing the set of operations to be performed on the second data store, wherein
the causing the set of operations to be performed on the second data store comprises
causing the producing the copy of the modified data to occur at the specified point in the sequential order on the second data store, and
if the set of operations produces the modified data and a portion of the modified data is not included in the selected data copied to the second data store,
the second data store comprises a copy of the portion of the modified data after the set of operations is performed on the second data store by virtue of the performing the set of operations on the second data store, and
the causing the set of operations to be performed on the second data store comprises producing the copy of the modified data at the specified point in the sequential order on the second data store.

* * * * *